(12) United States Patent
Belhaire

(10) Patent No.: US 9,964,622 B2
(45) Date of Patent: May 8, 2018

(54) DEVICE FOR DETECTING LASER SPOT WITH MATRIX DEVIOMETER HAVING A READOUT CIRCUIT AND A MATRIX OF PHOTODIODES

(75) Inventor: Eric Belhaire, Cachan (FR)

(73) Assignee: THALES, Courbevoie (FR)

( * ) Notice: Subject to any disclaimer, the term of this patent is extended or adjusted under 35 U.S.C. 154(b) by 455 days.

(21) Appl. No.: 13/518,882

(22) PCT Filed: Nov. 12, 2010

(86) PCT No.: PCT/EP2010/067344
§ 371 (c)(1),
(2), (4) Date: Jun. 23, 2012

(87) PCT Pub. No.: WO2011/076480
PCT Pub. Date: Jun. 30, 2011

(65) Prior Publication Data
US 2012/0274947 A1    Nov. 1, 2012

(30) Foreign Application Priority Data
Dec. 23, 2009   (FR) ..................................... 09 06264

(51) Int. Cl.
*G01S 3/784*   (2006.01)
*G01S 17/06*   (2006.01)
(Continued)

(52) U.S. Cl.
CPC .............. *G01S 3/784* (2013.01); *F41G 3/145* (2013.01); *F41G 7/226* (2013.01); *F41G 7/2293* (2013.01); *G01S 17/06* (2013.01)

(58) Field of Classification Search
CPC .......... G01S 3/784; G01S 3/781; G01S 3/783; G01S 11/12; G01S 17/10; G01S 17/06;
(Continued)

(56) References Cited

U.S. PATENT DOCUMENTS 5,280,167 A    1/1994 Dubois
6,133,989 A *  10/2000 Stettner et al. .............. 356/4.01
(Continued)

FOREIGN PATENT DOCUMENTS

EP    1361536 A1    11/2003
EP    1361613 A1    11/2003
EP    1925902 A1    8/2008

OTHER PUBLICATIONS

Bedabrata Pain, et al., "A Review of Infrared Readout Electronics for Space Science Sensors", Proceedings of the International Society for Optical Engineering, Jun. 15, 1993, pp. 1-47, vol. 2020, XP002457338.

*Primary Examiner* — Que T Le
*Assistant Examiner* — Jennifer Bennett
(74) *Attorney, Agent, or Firm* — Baker & Hostetler LLP

(57) ABSTRACT

In the field of deviometers used for detecting and locating laser spots, and more precisely to a laser spot detector with matrix deviometer, a device comprises a readout circuit exhibiting a matrix of pixels, a matrix of photodiodes produced on a single substrate, said photodiodes each comprising an individual electrode, and a laser pulse detection device. The particular feature of the device resides in the fact that said matrix of photodiodes is hybridized on said readout circuit by way of balls made of flexible and conducting material, such as indium, placed in contact with the pixels of the readout circuit, so that said single substrate constitutes an electrode common to the set of photodiodes and that said individual electrodes are linked to said pixels by said balls.

19 Claims, 2 Drawing Sheets

(51) Int. Cl.
*F41G 7/22* (2006.01)
*F41G 3/14* (2006.01)

(58) Field of Classification Search
CPC ........ F41G 7/226; F41G 7/2293; F41G 3/145;
G01C 3/08
USPC ...... 250/208.1, 214 R, 206, 214.1, 334, 332,
250/370.1, 203.1, 203.2, 206.1; 348/241,
348/295, 296, 294, 302; 257/291, 292,
257/257, 258, 431, 443, 444, 461, 290;
356/614, 4.01, 5.01, 5.03, 623, 4.07, 5.04
See application file for complete search history.

(56) References Cited

U.S. PATENT DOCUMENTS

| | | | |
|---|---|---|---|
| 6,362,482 B1* | 3/2002 | Stettner et al. | 250/370.08 |
| 6,448,572 B1* | 9/2002 | Tennant | G01S 7/4863 |
| | | | 250/559.38 |
| 7,397,019 B1 | 7/2008 | Byars et al. | |
| 7,999,231 B2* | 8/2011 | Iguchi | B82Y 20/00 |
| | | | 250/338.1 |
| 8,068,214 B1* | 11/2011 | Bhargava | G01S 7/495 |
| | | | 356/3.01 |
| 2003/0205663 A1 | 11/2003 | Boubal et al. | |
| 2003/0209650 A1 | 11/2003 | Boubal et al. | |
| 2004/0245592 A1* | 12/2004 | Harmon et al. | 257/438 |
| 2010/0012765 A1 | 1/2010 | Solenne | |

\* cited by examiner

DEVICE FOR DETECTING LASER SPOT WITH MATRIX DEVIOMETER HAVING A READOUT CIRCUIT AND A MATRIX OF PHOTODIODES

CROSS-REFERENCE TO RELATED APPLICATIONS

This application is a National Stage of International patent application PCT/EP2010/067344, filed on Nov. 12, 2010, which claims priority to foreign French patent application No. FR 0906264, filed on Dec. 23, 2009, the disclosures of which are incorporated by reference in their entirety.

FIELD OF THE INVENTION

The present invention lies in the field of deviometers used for detecting and locating laser spots, and more precisely relates to a laser spot detector with matrix deviometer.

This type of device is notably used in line of sight servocontrol systems, for laser-guided weaponry or laser designation pods.

BACKGROUND

Deviometers, as is known, make it possible to ensure a double function: the detection of a laser spot and the tracking of said spot. To this end, the deviometers of the prior art proceed in two phases:

initially, they ensure the detection of laser flashes, and the identification of the emission code for the associated laser spot, corresponding to a measurement of the instants of emission of the laser at the origin of the spot;

subsequently, they ensure the measurement of the position of the laser spot on a detector with four quadrants, by means of servocontrol aimed at centering the laser spot on said four-quadrant detector.

The main defects of these known deviometers are the following:

they exhibit a conflict between the size of the observed field and the sensitivity of the device: the more the observed field increases, the more considerable the noise and the more reduced the sensitivity;

the precision of measurement of the position of a laser spot on a four-quadrant detector is today insufficient in relation to needs.

To significantly improve the performance of these deviometers, notably in terms of precision and sensitivity, it turns out to be necessary a priori to develop fully matrix technologies.

The main solutions proposed are described in patents US 2003/0209650 and US 2003/0205663.

In the case of patent US 2003/0209650, there is disclosed a scheme consisting of the construction of a small reconfigurable matrix making it possible to displace a four-quadrant detector in a field of large dimension. A small reconfigurable matrix of photodiodes such as this allows fast detection of the position of the laser spot. This positioning is done by an iterative reduction in the field of vision so as to converge toward the precise position of the laser spot on the matrix of photodiodes.

In patent US 2003/0205663, there is described a deviometer comprising a readout circuit exhibiting a matrix of "intelligent" pixels, in the sense that said "intelligent" pixels themselves ensure the role of so many independent detectors, having their own inherent electronics. The "intelligent" pixels have the capacity to store the detected laser pulse. Thereafter, a global "OR" is applied to the set of pixels, allowing precise determination of the position of the laser spot on the matrix.

The known laser spot detectors exhibit various drawbacks, as a function of the technology that they implement. Four-quadrant detectors, though they are fast and allow continuous surveillance, have a sensitivity which decreases rapidly with the size of the observed field. Matrix solutions exhibit the defect of requiring complex, and therefore expensive electronics, in particular as regards the "intelligent" pixels. Moreover, "intelligent pixels" such as these, on account of their complexity, necessarily exhibit considerable dimensions, greater than 50 µm, entailing limited measurement precision. Furthermore, the electronics hampers the photodiodes and causes the loss of numerous photons.

Finally, the known matrix deviometer technologies require continuous reading of the set of pixels, over a potentially long integration time, so as to detect the arrival of a laser pulse. Long integration times such as these cause considerable noise, and therefore reduced sensitivity of the detector.

SUMMARY OF THE INVENTION

An aim of the invention is notably to alleviate the aforementioned drawbacks. Thus, the laser spot detector with matrix deviometer according to the present invention ensures laser spot detection and the precise measurement of its positioning on a matrix of pixels, while exhibiting improved performance in terms of signal-to-noise ratio, size of the observed field, and low cost.

It should moreover be noted that the laser spot detector according to the invention is notably effective for wavelengths situated in the near infrared, in contradistinction to the known devices resorting to matrix technologies, but implemented exclusively on silicon substrates, exhibiting reduced quantum effectiveness, in particular in the near infrared.

With this aim, the subject of the invention is a device for detecting laser spot with matrix deviometer, comprising:

a readout circuit exhibiting a matrix of pixels,
a matrix of photodiodes produced on a single substrate, said photodiodes each comprising an individual electrode 12,
a laser pulse detection device, characterized in that said matrix of photodiodes is hybridized on said readout circuit by way of balls made of flexible and conducting material, such as indium, placed in contact with the pixels of the readout circuit, so that said single substrate constitutes an electrode 10 common to the set of photodiodes and that said individual electrodes are linked to said pixels by said balls.

According to a first embodiment, the laser pulse detection device is integrated into the readout circuit.

According to a second embodiment, the laser pulse detection device is integrated into the single substrate.

According to a third embodiment, the laser pulse detection device is independent of the single substrate and of the readout circuit, and connected electrically to said single substrate.

Advantageously, the device according to the invention may be configured in such a way that:

the single substrate cooperates with the laser pulse detection device so as to detect the arrival of a laser pulse corresponding to said laser spot, on the readout circuit, the set of photodiodes being to this end considered to be a single photodiode, location of the laser spot on the matrix of pixels, read during a suitable integration time, is ensured by means of a "weighing" technique, consisting of a technique for calculating the barycenter of the laser spot, making it possible to locate said laser spot on the matrix of pixels, with a precision of less than the size of a pixel.

Advantageously, the laser pulse detection device measures the frequency of the laser pulse, corresponding to the laser spot, making it possible to calculate an arrival time of a subsequent laser pulse corresponding to the same laser spot.

Advantageously, the integration time associated with the reading of the matrix of pixels is centered substantially on said arrival time of the subsequent laser pulse.

Advantageously, the device according to the invention can furthermore comprise a complementary laser spot fast location electronic device.

In one implementation of the invention, the photodiode matrix may be of CMOS type.

Advantageously, said balls consist of indium.
Advantageously, said single substrate consists of:
silicon; or of:
InGaAs.
Advantageously, said single substrate may be n-doped.
Advantageously, said single substrate may be p-doped.

BRIEF DESCRIPTION OF THE DRAWINGS

Other characteristics and advantages of the invention will become apparent with the aid of the description which follows offered with regard to the appended drawings which represent.

DETAILED DESCRIPTION

Figure 1:
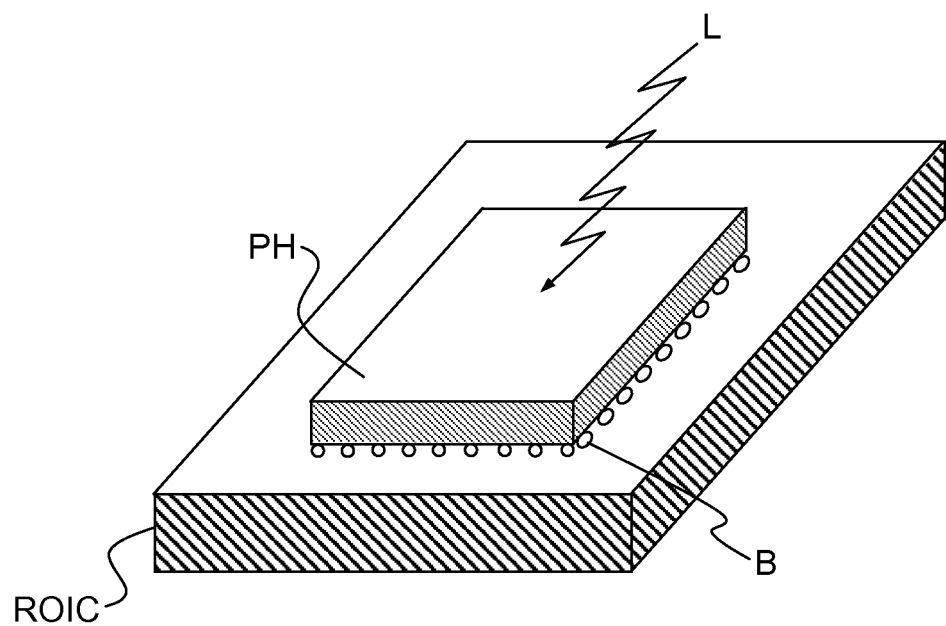
FIG. 1: a general diagram of a laser spot detector according to the invention.

FIG. 1 presents a diagram of the general structure of a laser spot detector with matrix deviometer, according to the invention. A matrix of pixels, not visible in FIG. 1, is arranged on a substrate, forming a readout circuit ROIC, commonly designated by the acronym ROIC for Read Out Integrated Circuit.

A matrix of photodiodes PH is constructed on a single substrate made of suitable semi-conducting material. This semi-conducting material must be photosensitive at the wavelength of the laser that one seeks to detect.

As exemplary semi-conducting material, it will be possible to use silicon, in particular in the visible and in the very near infrared. For laser spot detection in the near infrared, for example in the [0.9 µm, 1.7 µm] band, it will be possible to use InGaAs.

Generally, the matrix of photodiodes PH may be of any suitable semi-conducting material, that is to say one which has good quantum efficiency for the observed wavelength.

The matrix of photodiodes PH may ideally be of CMOS type, but not necessarily. Configured to be regarded as a single photodiode of large dimension, said matrix of photodiodes PH allows the fast detection of the arrival of a laser pulse, represented in the form of photons L striking the constituent photosensitive layer of the single substrate on which the matrix of photodiodes PH is arranged. Said detection is in fact actioned by a suitable electronic device D, chosen from the prior art and represented in the diagram of FIG. 3. This electronic pulse device D is connected to the electrode formed by the single substrate. It may be integrated on the integrated circuit ROIC or be independent and linked electrically to said single substrate.

The photodiodes PH are linked to the pixels of the readout circuit ROIC by way of balls made of flexible and conducting material, for example indium.

Figure 2:
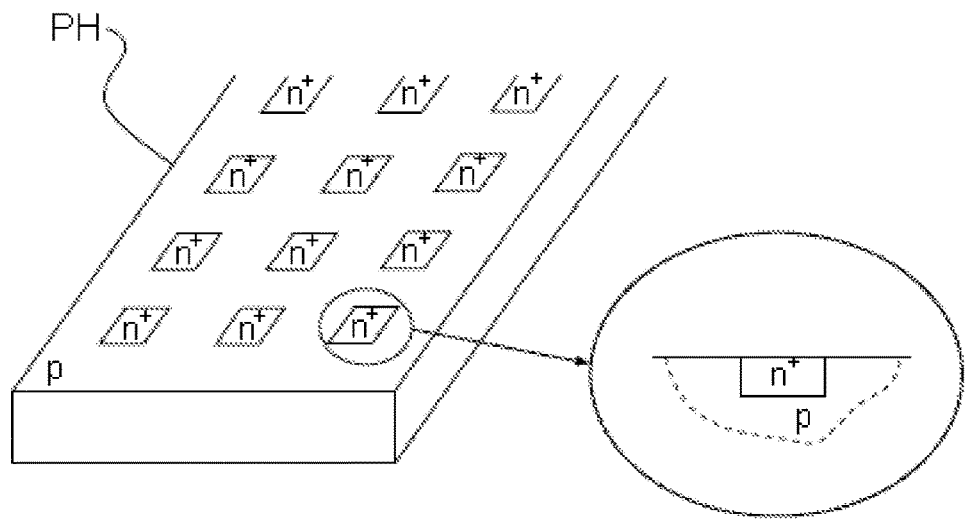
FIG. 2: a diagram presenting the operation of the photodiodes able to detect the arrival of a laser pulse.

When photons L strike the photosensitive layer supporting the photodiodes PH, FIG. 2 shows that said photodiodes are able to convert the energy of the photons L into electrical energy, subsequent to the formation of electron-hole pairs, according to a well known physical phenomenon. By way of example in FIG. 2, the single substrate of photosensitive semi-conducting material is p-doped, the formation of the photodiodes being consequently completed at the level of small n+ zones; when a photon arrives at such a photodiode, an electric current is transmitted, by way of the balls B represented in FIG. 1, to the readout circuit ROIC, which ensures the imager function.

Figure 3:
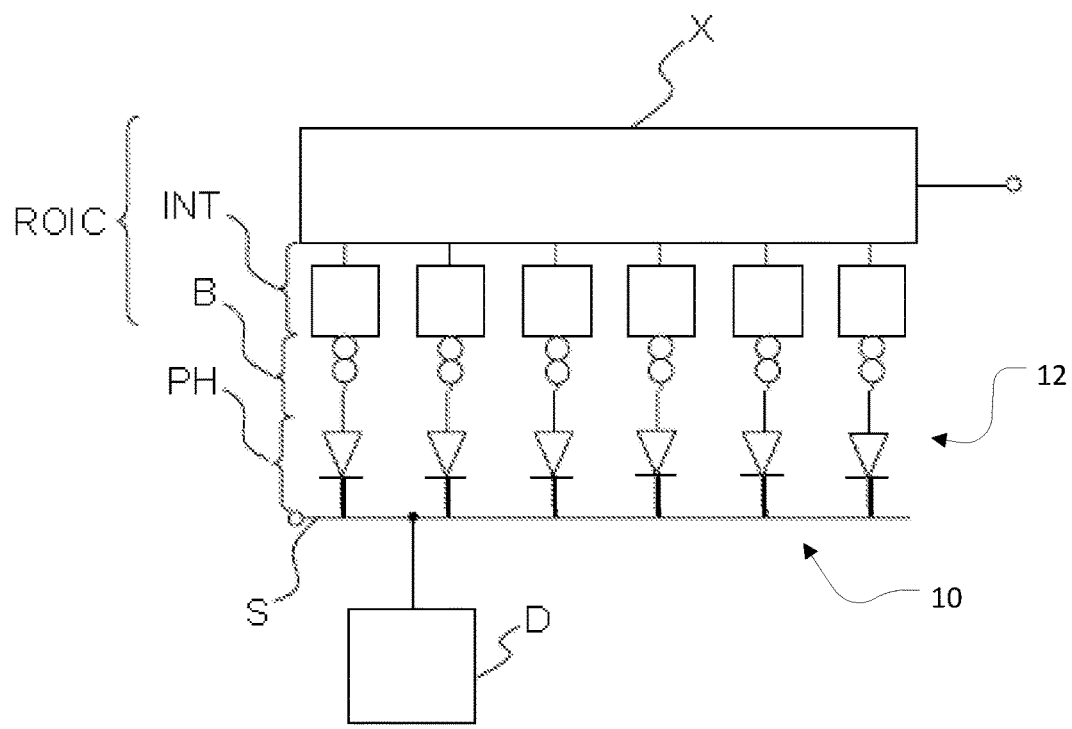
FIG. 3: the basic diagram of a laser spot detector with matrix deviometer, according to the invention.

FIG. 3 illustrates the operation of a detector with matrix deviometer according to the invention.

As has been seen, initially, the pulse detection electronic device D, connected to the single substrate S, or integrated into the circuit ROIC, detects the arrival of a laser pulse on the matrix of photodiodes PH. At the following laser pulse received, the pixels INT of the readout circuit ROIC are read during an integration time. The readout circuit ROIC also comprises a multiplexer X which constructs an image as a function of the information read out on the pixels INT.

By a known weighing technique, the detector with matrix deviometer will make it possible to precisely locate the position of the laser spot with respect to the matrix of photodiodes PH. This weighing technique consists in calculating the position of the barycenter of the laser spot, with a view to locating said laser spot on the matrix of pixels, with sub-pixel precision, that is to say less than the size of a pixel.

According to a preferred mode of implementation of the invention, the laser spot detector according to the invention comprises means for determining the frequency of the detected laser pulse.

This function is in general ensured by the pulse detection electronic device D. The importance of this parameter is two-fold. Firstly, this makes it possible to identify the code phase of the laser, so as to ensure that the detected laser is indeed the one that one sought to detect.

The other major importance is to make it possible to calculate the pulse time, and therefore the arrival time of the next laser pulse corresponding to the same laser. Consequently, it is possible for the reading of the pixels INT to be integrated only during an integration time centered on the arrival time of a subsequent laser pulse corresponding to the same laser. The advantage is that this makes it possible to minimize the noise, and therefore to optimize the sensitivity and the precision of the laser spot detector according to the invention.

Optionally, the device for detecting laser spot with matrix deviometer can comprise a device for deselecting pixels, with a view to eliminating the photodiodes suspected of malfunction, or to circumvent a spurious luminous spot.

This function may be carried out by means of small on/off switches disposed at the level of each photodiode or of each pixel.

To summarize, the subject of the invention is a device for detecting laser spot with matrix deviometer, its main advantage being that of combining high detection speed, by virtue of a matrix of photodiodes that may be of large size, used as a single photodiode for laser spot detection purposes, and high precision of location of said laser spot on the matrix of photodiodes, by virtue of the connection, by way of balls, of said photodiodes on a matrix of pixels belonging to a readout circuit, and of the implementation of a weighing technique.

The invention allows fast detection and sub-pixel location of a laser spot, without requiring large-size pixels or complex electronics.

The invention claimed is:

1. A device for detecting and locating a laser spot with a matrix deviometer, comprising:
   a readout circuit including a matrix of pixels;
   a matrix of photodiodes produced on a single substrate, said photodiodes each comprising an individual electrode; and
   a laser pulse detection device configured to sense a sum of respective electrical currents from all the photodiodes via the single substrate configured as a common electrode for all the photodiodes,
   wherein said matrix of photodiodes is hybridized on said readout circuit used to locate a laser pulse with a precision of less than the size of a pixel by way of balls made of flexible and conducting material placed in contact with the pixels of the readout circuit, said individual electrodes are linked to said pixels by said balls, the laser pulse detection device used to detect an arrival time of a laser pulse is connected to the set of photodiodes through the electrode formed by the single substrate, and the set of photodiodes is configured as a single photodiode.

2. The device as claimed in claim 1, wherein the laser pulse detection device is integrated into the readout circuit.

3. The device as claimed in claim 1 wherein the laser pulse detection device is integrated into the single substrate.

4. The device as claimed in claim 1, wherein the laser pulse detection device is independent of the single substrate and of the readout circuit, and connected electrically to said single substrate.

5. The device as claimed in claim 1, wherein location of the laser spot on the matrix of pixels, read during a suitable integration time, is ensured by means of a technique for calculating the barycenter of the laser spot to locate said laser spot on the matrix of pixels, with a precision of less than the size of a pixel.

6. The device as claimed in claim 1, wherein the laser pulse detection device measures a frequency of the laser pulse, corresponding to the laser spot, to calculate an arrival time of a subsequent laser pulse corresponding to the same laser spot.

7. The device as claimed in claim 5, wherein the integration time associated with the reading of the matrix of pixels is centered substantially on said arrival time of the subsequent laser pulse.

8. The device as claimed in claim 1, further comprising a complementary laser spot fast detection electronic device.

9. The device as claimed in claim 1, wherein the photodiode matrix is of CMOS type.

10. The device as claimed in claim 1, wherein said balls are made of indium.

11. The device as claimed in claim 1, wherein said single substrate includes:
    silicon; or
    InGaAs.

12. The device as claimed in claim 1, wherein said single substrate is n-doped.

13. The device as claimed in claim 1, wherein said single substrate is p-doped.

14. The device as claimed in claim 1, wherein the conducting material comprises indium.

15. A device for detecting and locating a laser spot with a matrix deviometer, comprising:
    a readout circuit including a matrix of pixels;
    a matrix of photodiodes produced on a single substrate, said photodiodes each comprising an individual electrode; and
    a laser pulse detection device used to detect an arrival time of a laser pulse, wherein a location of the laser spot on the matrix of pixels, read by the laser pulse detection device during a suitable integration time, is determined by a calculation of a barycenter of the laser spot, to locate said laser spot on the matrix of pixels with a precision of less than a size of a pixel,
    wherein said matrix of photodiodes is hybridized on said readout circuit by way of balls made of flexible and conducting material placed in contact with the pixels of the readout circuit, so that said single substrate constitutes an electrode common to the set of photodiodes, said individual electrodes are linked to said pixels by said balls, the laser pulse detection device is connected to the set of photodiodes through the electrode formed by the single substrate.

16. The device as claimed in claim 15, further comprising a complementary laser spot fast detection electronic device.

17. The device of claim 15, wherein the laser pulse detection device is configured to sense a sum of respective electrical currents from all the photodiodes via the single substrate configured as a common electrode for all the photodiodes.

18. A device for detecting and locating a laser spot with a matrix deviometer, comprising:
    a readout circuit including a matrix of pixels configured to locate said laser spot on the matrix of pixels with a precision of less than a size of a pixel;
    a matrix of photodiodes produced on a single substrate, said photodiodes each comprising an individual electrode; and
    a laser pulse detection device used to detect an arrival time of a laser pulse and configured to sense a sum of respective electrical currents from all the photodiodes via the single substrate configured as a common electrode for all the photodiodes,
    wherein said matrix of photodiodes is hybridized on said readout circuit by way of balls made of flexible and conducting material placed in contact with the pixels of the readout circuit, so that said single substrate constitutes an electrode common to the set of photodiodes, said individual electrodes are linked to said pixels by said balls, the laser pulse detection device is connected to the set of photodiodes through the electrode formed by the single substrate.

19. The device of claim 18, wherein a location of the laser spot on the matrix of pixels, read by the laser pulse detection device during a suitable integration time, is determined by a calculation of a barycenter of the laser spot.

* * * * *